US009972076B2

United States Patent
Palo

(10) Patent No.: US 9,972,076 B2
(45) Date of Patent: *May 15, 2018

(54) METHOD AND SYSTEM FOR IMAGE CORRECTION USING A QUASIPERIODIC GRID

(71) Applicant: PerkinElmer Cellular Technologies Germany GmbH, Tallinn (EE)

(72) Inventor: Kaupo Palo, Tallinn (EE)

(73) Assignee: PerkinElmer Cellular Technologies Germany GmbH, Tallinn (EE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/402,859

(22) Filed: Jan. 10, 2017

(65) Prior Publication Data

US 2017/0243335 A1   Aug. 24, 2017

Related U.S. Application Data

(63) Continuation of application No. 14/592,474, filed on Jan. 8, 2015, now Pat. No. 9,582,864.

(60) Provisional application No. 61/926,246, filed on Jan. 10, 2014.

(51) Int. Cl.
| | |
|---|---|
| *G06K 9/46* | (2006.01) |
| *G06K 9/50* | (2006.01) |
| *G06T 5/00* | (2006.01) |
| *G06T 7/80* | (2017.01) |
| *G06T 7/30* | (2017.01) |

(52) U.S. Cl.
CPC .............. *G06T 5/006* (2013.01); *G06T 7/30* (2017.01); *G06T 7/80* (2017.01)

(58) Field of Classification Search
CPC ..... G06T 5/006; G06T 7/0018; G06T 7/0024; G06T 2207/10004; G06K 9/4604
USPC .......................................... 382/201, 294, 275
See application file for complete search history.

(56) References Cited

U.S. PATENT DOCUMENTS

| | | | | |
|---|---|---|---|---|
| 5,825,947 | A | * | 10/1998 | Sasaki .............. G06K 19/06037 235/456 |
| 5,852,434 | A | | 12/1998 | Sekendur |
| 7,604,182 | B2 | | 10/2009 | Lapstun et al. |
| 7,806,342 | B2 | | 10/2010 | Lapstun et al. |
| 7,980,480 | B2 | | 7/2011 | Lapstun |
| 7,999,798 | B2 | | 8/2011 | Pettersson et al. |
| 8,282,016 | B2 | | 10/2012 | Lapstun |
| 8,413,027 | B2 | | 4/2013 | Lapstun et al. |
| 9,582,864 | B2 | | 2/2017 | Palo |

(Continued)

FOREIGN PATENT DOCUMENTS

| | | |
|---|---|---|
| EP | 1434169 A2 | 6/2004 |
| EP | 1188143 B1 | 5/2010 |

OTHER PUBLICATIONS

Aboufadel, E. et al., Position Coding, Arxiv.org, Cornell University Library, 12 pages (2007).

(Continued)

*Primary Examiner* — Samir Ahmed

(74) *Attorney, Agent, or Firm* — Choate, Hall & Stewart, LLP; William R. Haulbrook; Ronen Adato

(57) ABSTRACT

Described herein is a method for adjusting one or more images of a sample to correct geometric distortions and/or to properly align the one or more images using a pattern of dots, e.g., a quasiperiodic grid.

18 Claims, 22 Drawing Sheets

(56) References Cited

U.S. PATENT DOCUMENTS

| | | | |
|---|---|---|---|
| 2003/0179916 A1* | 9/2003 | Magnuson | C12Q 1/24 382/128 |
| 2004/0217278 A1* | 11/2004 | Overney | H01J 49/0027 250/288 |
| 2006/0091301 A1 | 5/2006 | Trisnadi et al. | |
| 2012/0112098 A1* | 5/2012 | Hoyt | B82Y 30/00 250/459.1 |
| 2013/0300703 A1 | 11/2013 | Sjogren et al. | |
| 2013/0314313 A1 | 11/2013 | Ericson et al. | |
| 2015/0199797 A1 | 7/2015 | Palo | |

OTHER PUBLICATIONS

International Search Report, PCT/EP2015/050349, 4 pages, dated May 12, 2015.
Written Opinion, PCT/EP2015/050349, 7 pages, dated May 12, 2015.

* cited by examiner

INITIAL PATTERN OVERLAY FROM 2 CHANNELS | INITIAL SAMPLE IMAGE OVERLAY FROM 2 CHANNELS

THE DETERMINED VECTOR FIELD FROM PATTERN IMAGE

METHOD AND SYSTEM FOR IMAGE CORRECTION USING A QUASIPERIODIC GRID

CROSS-REFERENCE TO RELATED APPLICATIONS

This application is a continuation of U.S. patent application Ser. No. 14/592,474, entitled Method and System for Image Correction Using a Quasiperiodic Grid, and filed on Jan. 8, 2015, which claims priority to, and the benefit of, and incorporates herein by reference in its entirety, U.S. Provisional Patent Application No. 61/926,246, filed Jan. 10, 2014.

TECHNICAL FIELD

This invention relates generally to methods and systems for image correction. More particularly, in certain embodiments, the invention relates to image correction using a quasiperiodic grid.

BACKGROUND

Acquired images may contain geometric distortions—such as radial, projective, and spherical distortions, and chromatic aberration—that can be difficult to correct. For example, it is desirable to correct a set of microscopy images acquired with one or more cameras (e.g., each capturing different spectral bands) for geometric distortions, or other optical aberrations or artifacts. Image correction is particularly important in applications such as the imaging of biological samples for clinical or research purposes, where acquired images must accurately represent the real object being imaged.

Where multiple images of a sample are obtained, either by a single camera or by multiple cameras, it is also desirable to register those images to create a composite image, and/or to relate the field captured in one image to the fields captured in the other images. For example, a set of images of a given biological sample may include images obtained at multiple spectral bands and/or at various magnifications. Such registration tasks may be complicated by the existence of geometric distortions in the individual images.

Where the set of images includes multiple fields of view (e.g., overlapping fields), registration of those multiple fields of view captured in the set of images may also be needed.

For an individual image, the relationship between coordinates of the image and coordinates in real space is not accurately known, without a frame of reference. Also, for a set of images of the same sample obtained using multiple cameras, the relationship between coordinates in an image and coordinates in real space may be different for different cameras, and, therefore, the images may be in bias with respect to each other. Furthermore, with more than a single field of view, the shift in the field of view in real space is not accurately known. Image registration, i.e., relating a set of images to a fixed coordinate system, may be needed for the set of images.

One technique that may be used to correct images for distortions is to use a test pattern having a known (or determinable) geometry in order to determine how to adjust images of a sample taken with the same camera under the same conditions, e.g., with the camera in the same fixed, relative position with respect to the subject being imaged as it was when imaging the test pattern. For example, a glass slide with fluorescently labeled beads of different sizes positioned thereupon can be used as a test pattern, and images of the bead test pattern can be used to determine how to adjust images of a sample taken under the same conditions. However, various difficulties may be encountered when using real beads as a test pattern for image adjustment. One of the difficulties is that different magnifications require different bead sizes. In addition, beads may not properly disperse, or they may be too difficult to image clearly. Moreover, the imaging and image correction procedure can be tedious and time consuming.

There is a need for a simpler, more effective method for adjusting one or more images of a sample to correct geometric distortions and/or to properly align the one or more images.

SUMMARY OF THE INVENTION

Described herein are systems and methods for adjusting one or more images of a sample to correct geometric distortions and/or to properly align the one or more images using a pattern of dots, e.g., arranged in a quasiperiodic lattice. By obtaining an image of the pattern of dots with a camera, it is possible to compare the imaged positions of the dots with the expected (actual) positions of the dots of the pattern, and thus determine a geometric transformation applicable to the image that would shift the relative positions of the dots to their actual real-world positions. The same transformation can then be applied to an image of a sample (e.g., biological sample) or other object that is obtained using the same camera in the same configuration as used to obtain the image of the pattern of dots, thereby correcting distortion in the image. Similarly, in some embodiments, the approach works to simultaneously (or substantially simultaneously) register multiple images of the same sample with respect to each other and/or correct those images for distortion.

In some embodiments, the use of a quasiperiodic lattice offers a number of benefits over the use of a periodic lattice to register multiple images with respect to each other and/or to correct the images for distortion. One of the benefits of using a quasiperiodic lattice over a periodic lattice is that a number of possible errors of registration by a grid period may be avoided, while at the same time the average grid density may be preserved, allowing for the use of the quasiperiodic lattice to correct image aberrations over the entire field of interest. Furthermore, defined (e.g., quantized) geometric characteristics such as distances to nearest neighbors in principle directions (quantized angles) of the lattice are also preserved by using a quasiperiodic lattice. Dots of the lattice can therefore be identified and a dictionary characterizing each dot with an alphanumeric character string and logging its xy-position can be created. The dictionary can be used to search for expected xy-positions of dots identified in an image of the quasiperiodic pattern.

Furthermore, in certain embodiments, the quasiperiodic lattice has differently sized dots at the vertices of different "generations." This allows for use of a single pattern over a wide range of various magnifications (e.g., 1.25×, 2×, 3×, 4×, 5×, 5-10×, 5-15×, 10-20×, 10-30×, 10-50×, 25-75×, 75-100×, 75-150×, and other desired magnifications).

In some embodiments, the pattern of dots is a quasiperiodic pattern that has one, two, three, or all four of the following properties: (i) local uniqueness, that is, by scanning a large-enough portion of an image of the pattern, it is possible to identify the correct portion of the pattern; (ii) approximately uniform local density of dots; (iii) ability to match an imaged dot with its expected location in the pattern from easily-identified, quantized nearest neighbor relations; and (iv) pattern elements have a discrete set of possible mutual positions. Here, local uniqueness does not necessarily require that there be only a single dot in the entire pattern with the same nearest neighbor relations. Because multiple dots are identified in the image (e.g., from about 10 to about 600, e.g., from about 10 to about 50, from about 10 to about 100, from about 100 to about 300, from about 200 to about 500, from about 400 to about 600, etc.), there will be an area of dots that are close together (accumulation area), and the correct corresponding dots can be identified based on the location of the accumulation area. Thus, in some embodiments, a pattern can have millions of dots (e.g., 1 to 5 million, e.g., 2 million dots), and it is still possible to very quickly scan an image of the pattern and very quickly identify the corresponding correct locations.

In certain embodiments, pentagonal lattices are used. In certain embodiments, the geometric pattern is formed by triangulation of a pentagon, e.g., golden section triangulation (or other quantized triangulation) of a pentagon. In some embodiments, lattices having non-pentagonal shapes may be used.

In one aspect, the invention is directed to a method for adjusting one or more images of a sample to correct geometric distortions and/or align the one or more images, the method including: obtaining one or more images of a sample using one or more cameras at fixed position(s) with respect to the sample; obtaining one or more images of a two-dimensional graphical pattern using the same one or more cameras in the same fixed position(s) that were used (or that will be used) to obtain the one or more images of the sample, wherein the graphical pattern is a lattice comprising dots at vertices that define one or more types of geometric shapes, wherein the lattice of dots is non-periodic (e.g., quasiperiodic), and wherein absolute (e.g., expected) positions of the imaged dots can be determined; and automatically adjusting, by a processor of a computing device, the one or more images of the sample using the one or more images of the two-dimensional graphical pattern to correct geometric distortions and/or to align the one or more images of the sample.

In some embodiments, the lattice of dots is hierarchical. In some embodiments, the lattice of dots has one, two, three, or all four of the following properties (i) local uniqueness (e.g., that is, by scanning a large-enough portion of an image of the pattern, it is possible to identify the correct portion of the pattern); (ii) approximately uniform local density of dots; (iii) ability to match an imaged dot with its expected location in the pattern from easily-identified, quantized nearest neighbor relations; and (iv) dots of the graphical pattern have a discrete set of possible mutual positions (e.g., not infinite).

In some embodiments, the step of automatically adjusting the one or more images of the sample includes determining one or more geometric transformations according to a mapping between imaged dots in the one or more registration images and the determined absolute positions of the dots (e.g., absolute coordinates for the dot centers), and applying the one or more geometric transformations to the one or more images of the sample to correct geometric distortions in the one or more images of the sample and/or to align the one or more images of the sample. In some embodiments, the one or more images of the sample includes one or more images of a multiple-well microtiter plate, and wherein the one or more cameras comprises one or more cameras of a microplate imager.

In some embodiments, the graphical pattern inhabits the same plane, or approximately the same plane, as the sample, in relation to the one or more cameras. In some embodiments, the dots of the graphical pattern include closed circles, open circles, closed non-circular shapes, and/or open non-circular shapes. In some embodiments, the dots of the graphical pattern are vertices defining pentagons subdivided into triangles (e.g., two kinds of triangles). In some embodiments, the lattice of dots is hierarchical, wherein hierarchical means the pattern includes dots that are differently-sized according to which of a plurality of generations they belong to (e.g., a set of large dots belong to a first generation, a set of smaller dots belong to a second generation formed by subdividing shapes defined by the first generation dots, a set of even smaller dots belong to a third generation formed by subdividing shapes defined by the first and/or second generation dots, etc.).

In some embodiments, the absolute position of an imaged dot is determined by detecting distances to nearest neighbors of the imaged dot in a fixed number of principle directions (e.g., nearest same-generation neighbors in the given principle directions) to identify the corresponding unique dot of the geometric pattern and its known absolute position.

In some embodiments, the method also includes obtaining multiple images of a sample at different wavelengths either using multiple cameras, or using one camera at different times, and using the one or more images of the two-dimensional graphical pattern to correct geometric distortions and/or to align the multiple images of the sample at different wavelengths (e.g., to register the multiple images of the sample), wherein the lattice of dots of the graphical pattern is non-periodic (e.g., quasiperiodic). In some embodiments, the graphical pattern is also hierarchical.

In some embodiments, the method also includes obtaining multiple images of a sample using multiple cameras, thereby obtaining images having different fields of view, and using the images of the two-dimensional graphical pattern obtained using the multiple cameras to correct geometric distortions and/or to align the multiple images of the sample (e.g., to register the multiple images of the sample), wherein the lattice of dots of the graphical pattern is non-periodic (e.g., quasiperiodic). In some embodiments, the graphical pattern is also hierarchical.

In some embodiments, the method also includes obtaining multiple images of a sample at multiple resolutions (e.g., multiple magnifications), and using the images of the two-dimensional graphical pattern to correct geometric distortions and/or to align the multiple images of the sample (e.g., to register the multiple images of the sample), wherein the graphical pattern of dots is hierarchical.

In another aspect, the invention is directed to a system for adjusting one or more images of a sample to correct geometric distortions and/or align the one or more images, the system including: a processor; and a memory having instructions stored thereon, wherein the instructions, when executed by the processor, cause the processor to: automatically adjust the one or more images of the sample using one or more images of a two-dimensional graphical pattern to correct geometric distortions and/or to align the one or more images of the sample, wherein the graphical pattern is a lattice comprising dots at vertices that define one or more types of geometric shapes, wherein the lattice of dots is non-periodic (e.g., quasiperiodic), wherein absolute (e.g., expected) positions of the imaged dots can be determined, and wherein the one or more images of the two-dimensional graphical pattern were obtained using the same one or more cameras in the same fixed position(s) that were used (or that will be used) to obtain the one or more images of the sample.

In another aspect, the invention is directed to a method for registering a plurality of images capturing different fields of view, the method including: obtaining a first set of images of a sample (e.g., images of multiple wells obtained by a microplate imager) with a plurality of cameras at fixed relative positions with respect to each other and at fixed positions in real space with respect to the sample, each camera at a fixed magnification, wherein the fields of view of the multiple cameras are not co-extensive (e.g., the fields of view of the cameras are different from each other, but may overlap); obtaining a first set of registration images of a two-dimensional graphical pattern using the plurality of cameras at the same fixed relative positions with respect to each other, at the same fixed positions with respect to the graphical pattern, and at the same fixed magnification(s) as were used in obtaining the first set of images of the sample (e.g., the graphical pattern inhabits the same plane, or approximately the same plane, as the sample, in relation to the cameras) (e.g., wherein the graphical pattern covers the entirety of the fields of view of the plurality of cameras), wherein the graphical pattern is a hierarchical, non-random, non-periodic (e.g., quasiperiodic) lattice comprising dots (e.g., closed circles, open circles, closed non-circular shapes, and/or open non-circular shapes) at vertices that define one or more types of geometric shapes (e.g., pentagons subdivided into two kinds of triangles), wherein the pattern comprises dots that are differently-sized according to which of a plurality of generations they belong to, thereby allowing use of a single pattern to register images from the plurality of cameras over a wide range of magnifications (e.g., a set of large dots belong to a first generation, a set of smaller dots belong to a second generation formed by subdividing shapes defined by the first generation dots, a set of even smaller dots belong to a third generation formed by subdividing shapes defined by the first and/or second generation dots, etc.), wherein the position of the dots in relation to each other is known; automatically determine, by a processor of a computing device, relative positions of image fields of the plurality of cameras using at least the first set of registration images of the two-dimensional graphical pattern; automatically register, by the processor of the computing device, the first set of images of the sample in relation to each other according to the determined relative positions of the image fields (e.g., apply one or more geometric transformations to the first set of images of the sample according to the determined relative positions of the image fields).

In some embodiments, the method also includes graphically rendering, by the processor of the computing device, a composite image from the first set of registered images of the sample. In some embodiments, automatically determining the relative positions of the image fields of the plurality of cameras includes identifying unique real-space positions of dots of the pattern captured in the first set of registration images.

In some embodiments, automatically determining the relative positions of the image fields of the plurality of cameras includes deriving unique real-space positions of dots of the pattern captured in the first set of registration images from known relative position constraints of the pattern (e.g., quantized nearest neighbor positions and/or angles).

In some embodiments, the differently-sized dots comprise: a set of largest dots having a first size and belonging to a first generation; a set of dots having a second size being smaller than the first size and belonging to a second generation formed by subdividing shapes defined by the first generation dots; and a set of dots of a third size being smaller than the second size and belonging to a third generation formed by subdividing shapes defined by the first and/or second generation dots.

In another aspect, the invention is directed to a system for registering a plurality of images capturing different fields of view, the system including: a processor; and a memory having instructions stored thereon, wherein the instructions, when executed by the processor, cause the processor to: determine relative positions of image fields of a plurality of cameras using at least a first set of registration images of a two-dimensional graphical pattern, wherein the first set of registration images are images of a two-dimensional graphical pattern obtained using the plurality of cameras at the same fixed relative positions with respect to each other, at the same fixed positions with respect to the graphical pattern, and at the same fixed magnification(s) as were used in obtaining a first set of images of a sample (e.g., the graphical pattern inhabits the same plane, or approximately the same plane, as the sample, in relation to the cameras) (e.g., wherein the graphical pattern covers the entirety of the fields of view of the plurality of cameras), wherein the fields of view of the multiple cameras are not co-extensive (e.g., the fields of view of the cameras are different from each other, but may overlap), wherein the graphical pattern is a hierarchical, non-random, non-periodic (e.g., quasiperiodic) lattice comprising dots (e.g., closed circles, open circles, closed non-circular shapes, and/or open non-circular shapes) at vertices that define one or more types of geometric shapes (e.g., pentagons subdivided into two kinds of triangles), wherein the pattern comprises dots that are differently-sized according to which of a plurality of generations they belong to, thereby allowing use of a single pattern to register images from the plurality of cameras over a wide range of magnifications (e.g., a set of large dots belong to a first generation, a set of smaller dots belong to a second generation formed by subdividing shapes defined by the first generation dots, a set of even smaller dots belong to a third generation formed by subdividing shapes defined by the first and/or second generation dots, etc.), wherein the position of the dots in relation to each other is known; and register the first set of images of the sample in relation to each other according to the determined relative positions of the image fields (e.g., apply one or more geometric transformations to the first set of images of the sample according to the determined relative positions of the image fields).

In another aspect, the invention is directed to a non-transitory computer readable medium having instructions stored thereon, wherein the instructions, when executed by a processor, cause the processor to: determine relative positions of image fields of a plurality of cameras using at least a first set of registration images of a two-dimensional graphical pattern, wherein the first set of registration images are images of a two-dimensional graphical pattern obtained using the plurality of cameras at the same fixed relative positions with respect to each other, at the same fixed positions with respect to the graphical pattern, and at the same fixed magnification(s) as were used in obtaining a first set of images of a sample (e.g., the graphical pattern inhabits the same plane, or approximately the same plane, as the sample, in relation to the cameras) (e.g., wherein the graphical pattern covers the entirety of the fields of view of the plurality of cameras), wherein the fields of view of the multiple cameras are not co-extensive (e.g., the fields of view of the cameras are different from each other, but may overlap), wherein the graphical pattern is a hierarchical, non-random, non-periodic (e.g., quasiperiodic) lattice comprising dots (e.g., closed circles, open circles, closed non-circular shapes, and/or open non-circular shapes) at vertices that define one or more types of geometric shapes (e.g., pentagons subdivided into two kinds of triangles), wherein the pattern comprises dots that are differently-sized according to which of a plurality of generations they belong to, thereby allowing use of a single pattern to register images from the plurality of cameras over a wide range of magnifications (e.g., a set of large dots belong to a first generation, a set of smaller dots belong to a second generation formed by subdividing shapes defined by the first generation dots, a set of even smaller dots belong to a third generation formed by subdividing shapes defined by the first and/or second generation dots, etc.), wherein the position of the dots in relation to each other is known; and register the first set of images of the sample in relation to each other according to the determined relative positions of the image fields (e.g., apply one or more geometric transformations to the first set of images of the sample according to the determined relative positions of the image fields).

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

FIG. 3A shows a full pattern layout (22 mm wide), with a maximum field of view of 10.5 mm×10.5 mm. The frames shown in FIG. 3A have resolutions 2×, 10×, 40×, and 100×. FIG. 3A includes 5 sizes (generations) of dots, that are shown in further detail in FIGS. 3B-3F.

FIG. 6A shows a generated dot image at 1.25× magnification. FIG. 6B shows a generated dot image at 5× magnification. FIG. 6C shows a generated dot image at 10× magnification. FIG. 6D shows a generated dot image at 20× magnification. FIG. 6E shows a generated dot image at 40× magnification. FIG. 6F shows a generated dot image at 66× magnification.

FIG. 8 shows an initial pattern overlay from two channels (top left), an initial sample image overlay from two channels (top right), and the determined vector field from the pattern image (bottom left).

FIG. 9 shows a two-channel overlay of the corrected sample image.

DETAILED DESCRIPTION

Figure 1:
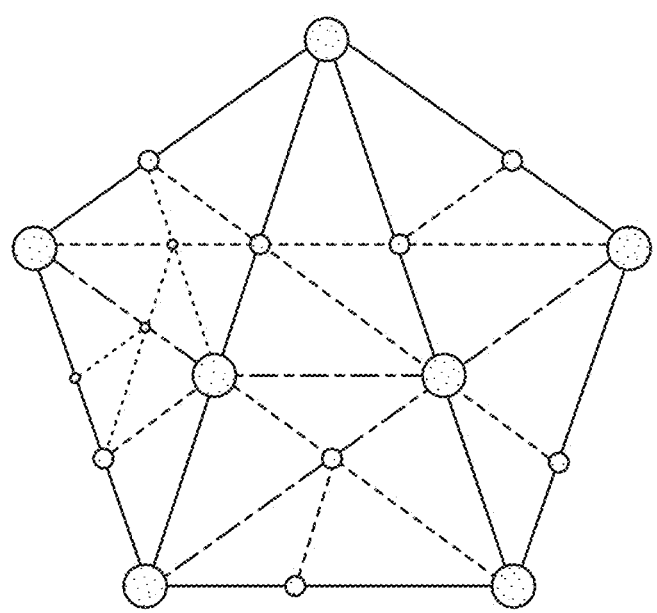
FIG. 1 shows an example of grid refinement performed by Golden Section triangulation of a pentagon, in accordance with some embodiments of the present invention.

It is contemplated that apparatus, systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where apparatus, articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Described herein are systems and methods for adjusting one or more images of a sample to correct geometric distortions and/or to properly align the one or more images. In certain examples, the sample is a microtiter plate of wells containing biological material. Previous image alignment methods involved obtaining test images of a glass slide with fluorescently labeled beads of different sizes positioned thereupon. This technique suffered from a number of various disadvantages. Some embodiments discussed herein relate to the use of an artificial pattern of dots that allow for image adjustment and registration over a variety of magnifications.

For example, in some embodiments, one or more images of a pattern of dots is acquired, and for each image, the expected distortion-free dot positions are determined (e.g., the "real world" coordinates) and compared to their positions in the image(s). In some embodiments, a geometric transformation is computed that moves the centers of the imaged dots to their expected positions (their "real world" positions), and the transformation is stored. Then, for each sample to be imaged (e.g., a biological sample), a set of images of the sample is acquired using the same camera set-up as was used to obtain the image(s) of the pattern of dots. The stored geometric transformation that was determined using the pattern of dots is applied to the image(s) of the sample to perform the correction/registration, and the corrected image(s) is/are stored and/or displayed.

In one embodiment, a set of one or more images of a quasiperiodic grid pattern using the same camera or same set of cameras as used (or to be used) for obtaining images of a sample (or other object) is obtained. The identical camera adjustment(s) and identical relative positioning of the fields of view are used in obtaining the images of the grid pattern as are used in obtaining images of the sample. Thus, when obtaining images of the sample and images of the grid pattern, it is assumed that images obtained using the same camera are made under similar (or same) optical conditions and/or relative alignment of different cameras, and it is assumed that relative displacements of the image fields are kept constant.

Next, in some embodiments, the true geometry of the acquired images is reconstructed using known properties of the quasiperiodic grid. This step eliminates geometric distortions induced by the optical system. In some embodiments, an approach involves using the local uniqueness of the imaged pattern to identify dots in the pattern and to determine their true positions from the known design of the grid pattern. In another approach, geometrical properties of the quasiperiodic grid are used to derive the true geometry from known relative positioning constraints, e.g., quantized nearest neighbor positions and quantized angles, used in creating the pattern. From the knowledge of the true geometry, transformations are derived that eliminate geometric distortions.

Next, in some embodiments, where images from different cameras were obtained, the images from different cameras are related to each other using known unique positions of the imaged dots identified in the pattern. Next, relative positions of image fields are derived if unique positions of the imaged dots are known, or the relative positions of image fields may be determined if the fields capture partially overlapping areas.

Finally, in some embodiments, the geometric transformations derived in the above steps may be applied to images of the sample (or other object) obtained using the same camera(s) and the same optical arrangement as used in obtaining images of the quasiperiodic grid pattern.

The use of a quasiperiodic lattice offers a number of benefits over the use of a periodic lattice. In some embodiments, errors of registration by a grid period are avoided by use of a quasiperiodic lattice, while at the same time average grid density is preserved and defined (e.g., quantized) geometric characteristics such as nearest neighbor length and angles are preserved.

In some embodiments, the quasiperiodic lattice has differently sized dots at the vertices of different "generations" (as shown, for example in FIG. 1). This allows for the use of a single pattern over a wide range of different magnifications.

Furthermore, in some embodiments, the pattern is a grid of pentagonal symmetry. One way of obtaining such a lattice is to generate a Penrose tiling and associate structural elements of the pattern (dots) with the tile positions or the vertices. In one approach, the pattern starts with a pentagon subdivided into two kinds of triangles, which are hierarchically subdivided in Golden Section which results in new triangles of the same shape (as shown, for example, in FIG. 1). The dots of decreasing sizes are associated at newly created vertices.

In some embodiments, a non-periodic grid (e.g., a grid that is not replicated by translation of its points) is needed to avoid false matching of dots. For example, the procedure for adjusting one or more images of a sample to correct geometric distortions and/or to properly align the one or more images will not work where a unique location cannot be determined for a given dot. Moreover, in some embodiments, it is desired that the dots of the pattern uniformly populate the field of interest so that the entire field can be corrected. Furthermore, in some embodiments, a hierarchy of dot sizes is desired to work simultaneously at different scales (e.g., different resolutions/magnifications). A quasiperiodic grid pattern can provide all of these desired properties mentioned above, among others. One suitable pattern of a quasiperiodic grid is similar to Penrose tiling. For example, a Golden Section triangulation of a pentagon can produce a pattern with the desired properties. At each step of grid refinement, the size of the dot located at the vertices is reduced, as shown in FIG. 1.

FIG. 1 shows an example of grid refinement by performing Golden Section triangulation of a pentagon, as discussed above. Smaller dots at the vertices of the triangles belong to subsequent generations.

Figure 2:
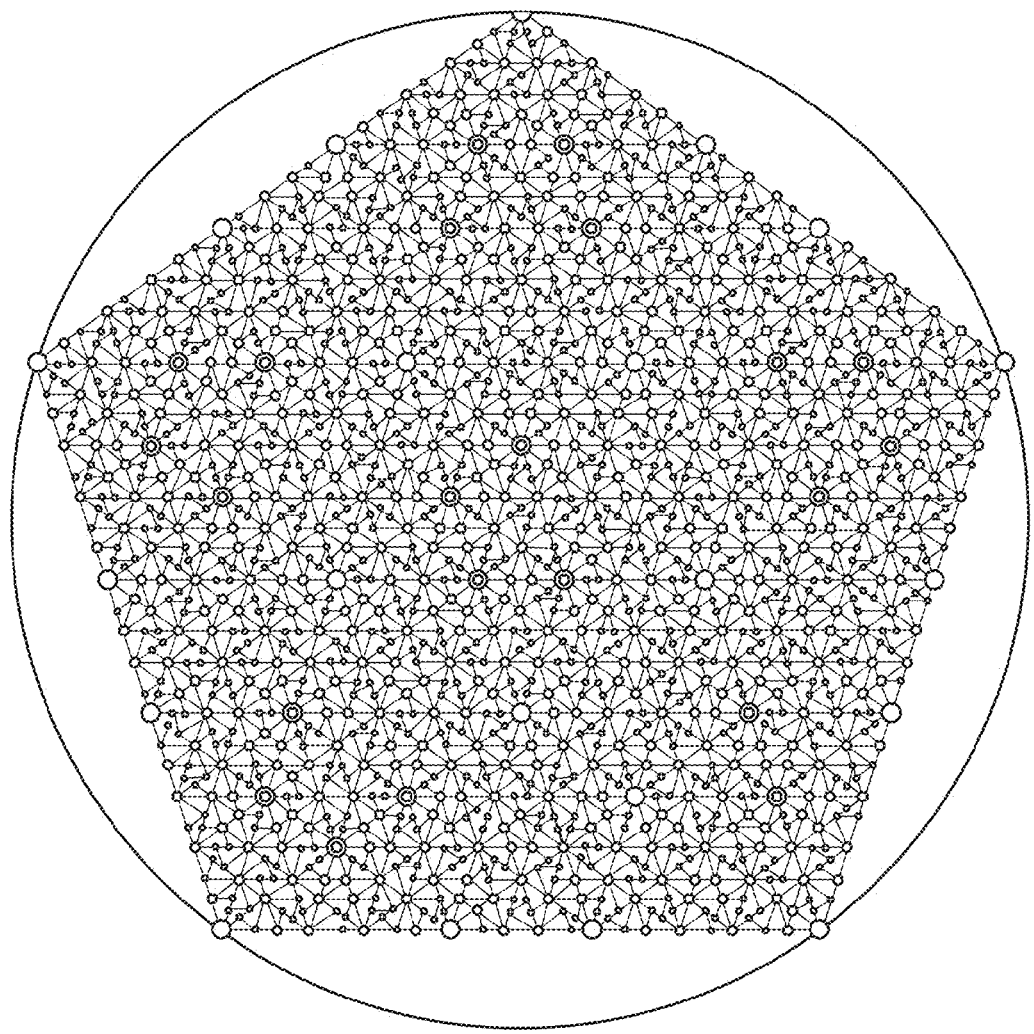
FIG. 2 shows a pattern created by performing Golden Section triangulation of a pentagon shown in FIG. 1, where each grid point has a unique pattern of neighbors, in accordance with some embodiments of the present invention.

FIG. 2 shows a pattern created by performing Golden Section triangulation, as discussed above. The pattern shown in FIG. 2 is designed such that each grid point has a unique pattern of neighbors. In some embodiments, it is possible to use the local pattern of neighbors (e.g., via automatic scanning of the image) to identify each particular grid point in an image of the pattern and to compare the position of each particular grid point in the image to its expected position in the pattern, thereby linking locations in the image to their expected locations, and enabling the correction of any distortions resulting from discrepancies. The same correction is made to images of samples obtained using the same camera arrangement.

In certain embodiments, the pattern is slightly rotated to avoid parallel alignments with image borders (and to avoid any resulting distortions). For example, the image may be rotated by from 1 to 30 degrees (e.g., by 9 degrees). In some embodiments, the image may be rotated by 1-5 degrees, 3-10 degrees, 5-15 degrees, 10-15 degrees, 10-20 degrees, 15-25 degrees, 25-30 degrees. In some embodiments, the image may be rotated by any suitable degree.

Figure 3A:
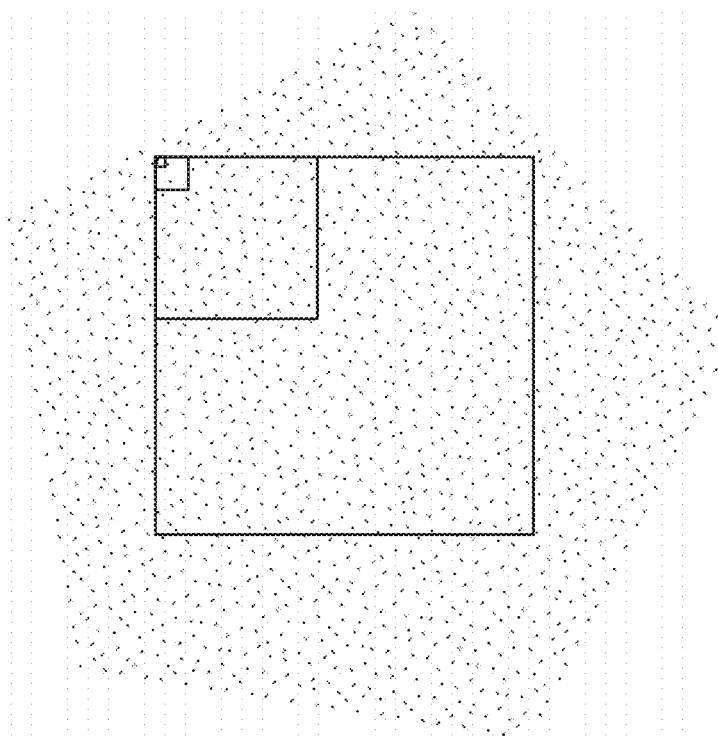
FIG. 3A shows a pattern that satisfies certain production requirements, in accordance with some exemplary embodiments of the present invention.
Figure 3B:
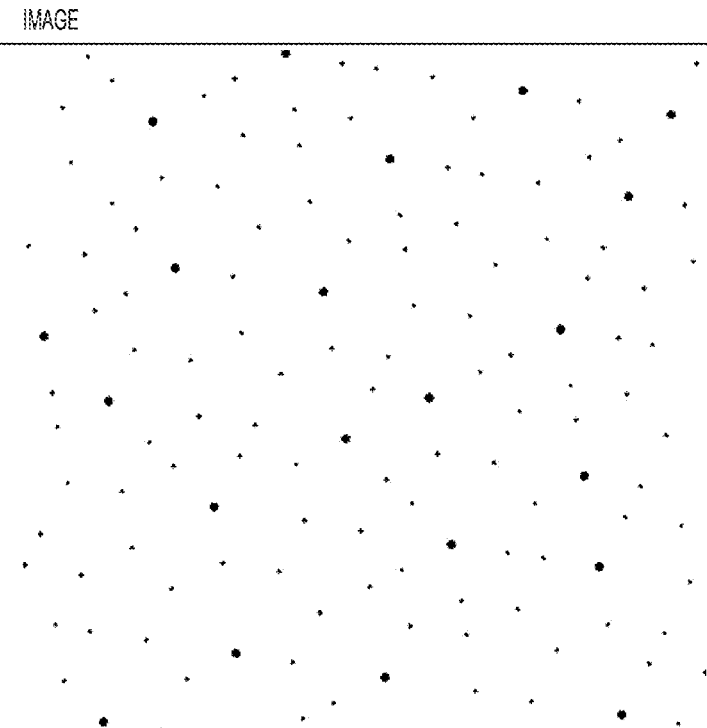
FIG. 3B shows a 400×400 pixel view of 2× magnification for the pattern layout shown in FIG. 3A, in accordance with some embodiments of the present invention.
Figure 3C:
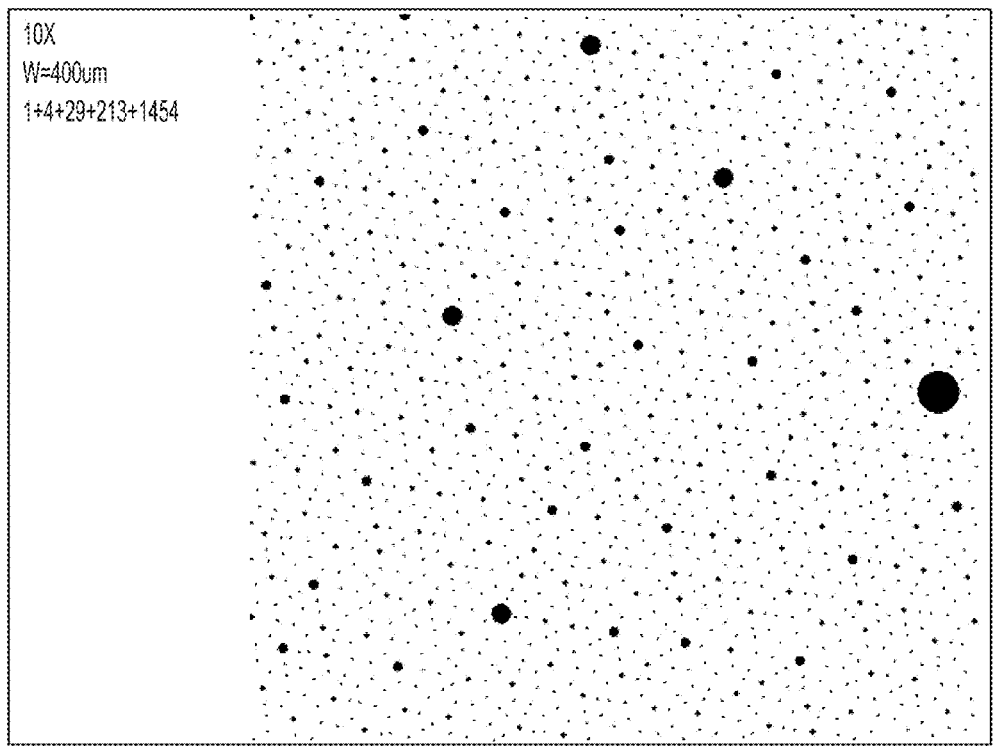
FIG. 3C shows a 400×400 pixel view of 10× magnification for the pattern layout shown in FIG. 3A, in accordance with some embodiments of the present invention.
Figure 3D:
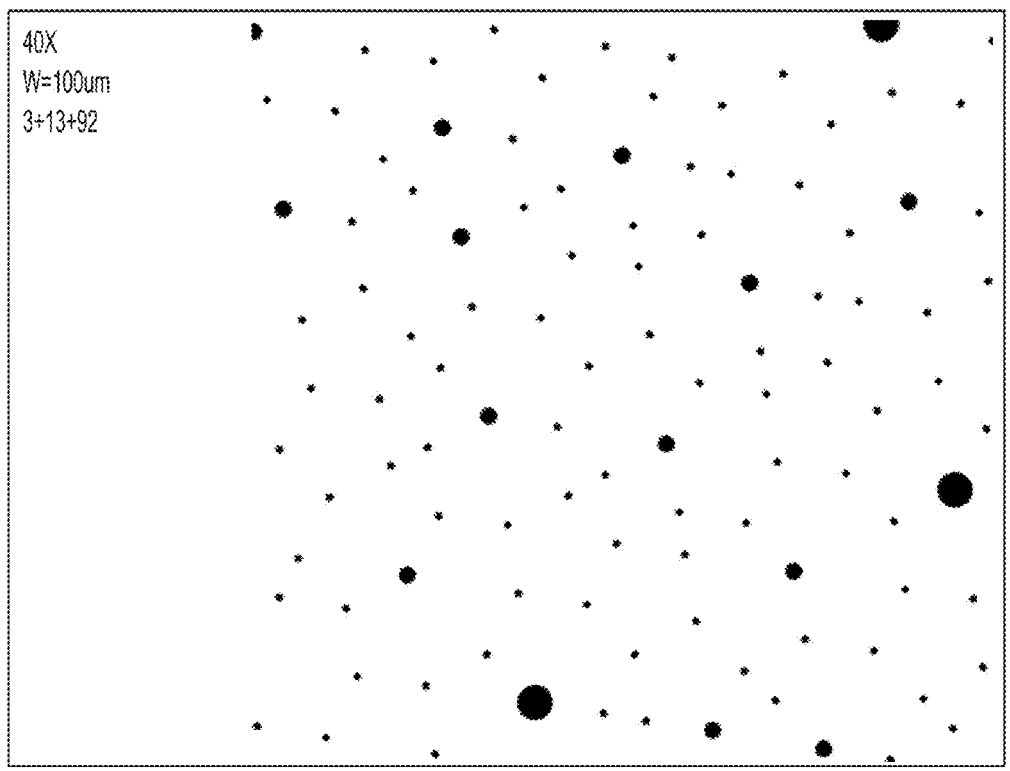
FIG. 3D shows a 400×400 pixel view of 40× magnification for the pattern layout shown in FIG. 3A, in accordance with some embodiments of the present invention.
Figure 3E:
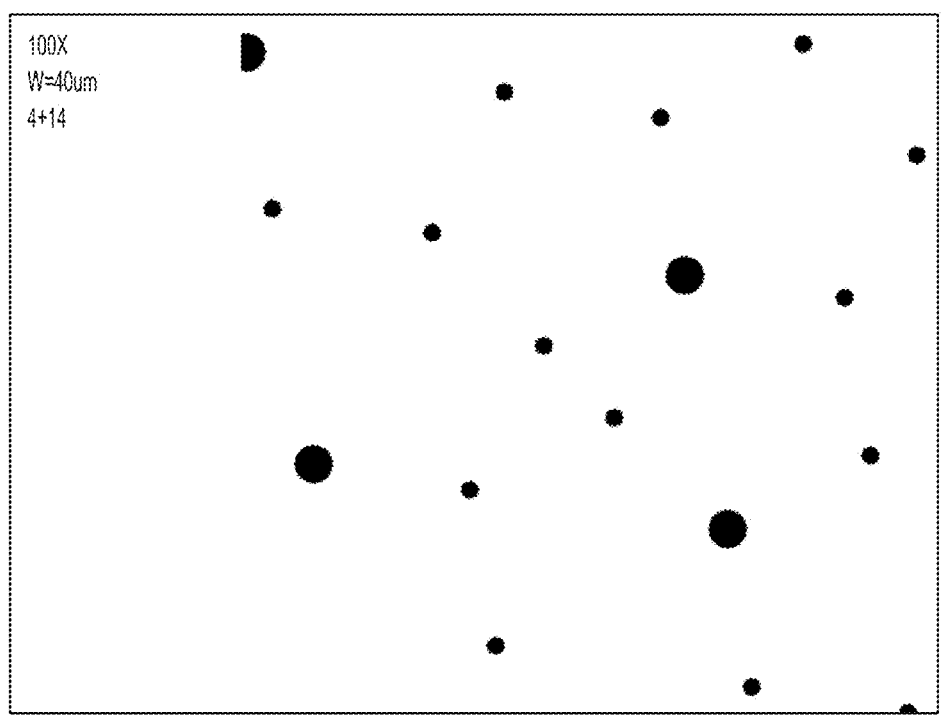
FIG. 3E shows a 400×400 pixel view of 100× magnification for the pattern layout shown in FIG. 3A, in accordance with some embodiments of the present invention.

FIG. 3A shows a grid pattern that satisfies certain production requirements. For example, in FIG. 3A, a full pattern layout is displayed (22 mm wide), with a maximum field of view of 10.5 mm×10.5 mm, and with frames of 900×900 pixels of resolutions 2×, 10×, 40×, and 100×. FIG. 3B shows a 400×400 pixel view of 2× magnification; FIG. 3C shows a 400×400 pixel view of 10× magnification; FIG. 3D shows a 400×400 pixel view of 40× magnification; and FIG. 3E shows a 400×400 pixel view of 100× magnification. In the views shown in FIGS. 3A-3E, there are 5 sizes (generations) of dots, as shown in Table 1 below.

TABLE 1

Distribution of Dots in FIGS. 3A-3F

| Diameter (µm) | Minimum Distance (µm) | Maximum Distance (µm) | Count |
|---|---|---|---|
| 1.0 | 9.3 | 15.0 | 2521295 |
| 2.2 | 24.3 | 39.3 | 368322 |
| 4.7 | 63.7 | 103.1 | 53917 |
| 10.3 | 166.8 | 270.0 | 7935 |
| 22.5 | 436.9 | 706.9 | 1406 |

Figure 3F:
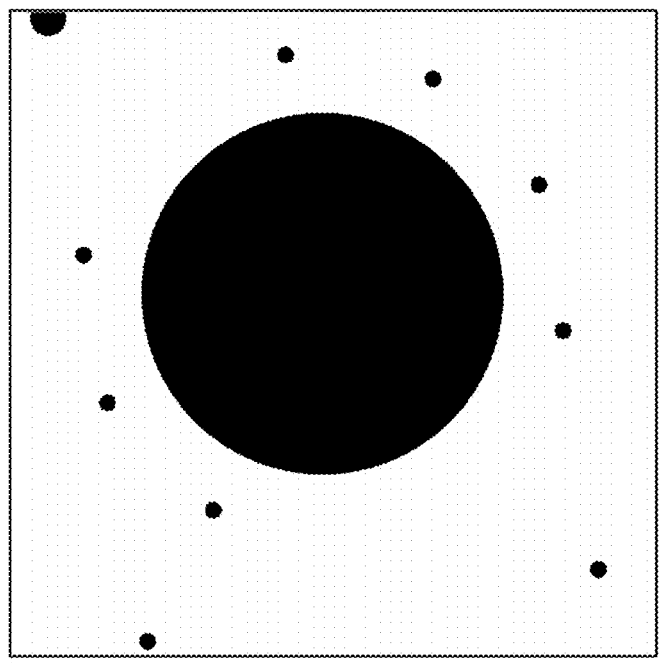
FIG. 3F shows a 22.5 micrometer disk (dot) at 100× magnification for the pattern layout shown in FIG. 3A, in accordance with some embodiments of the present invention.

In the last column (labeled "Count") of Table 1 above there is simple regularity: —the count decreases as the diameter of the dots increases. Distances between the dots scale as Golden Section square ($\varphi^2=1.618^2=2.618$) and areas/counts scale as Golden Section fourth power ($1.618^4=6.854$). Thus, as shown in Table 1, for the largest dot of diameter=1 µm, the minimum distance to a subsequent dot is 9.3 µm, the maximum distance to a subsequent dot is 15.0 µm, and the count is 2521295. For the next largest dot, the diameter is 2.2 µm, the minimum distance to a subsequent dot is 24.3 µm, the maximum distance to a subsequent dot is 39.3 µm, and the count is 368322. The scale of dot diameters is chosen to grow slightly slower than linear dimensions so that larger dots (disks) do not cover overly large areas, possibly obscuring smaller dots. FIG. 3F shows the 22.5 micrometer disk at 100× magnification.

Figure 4:
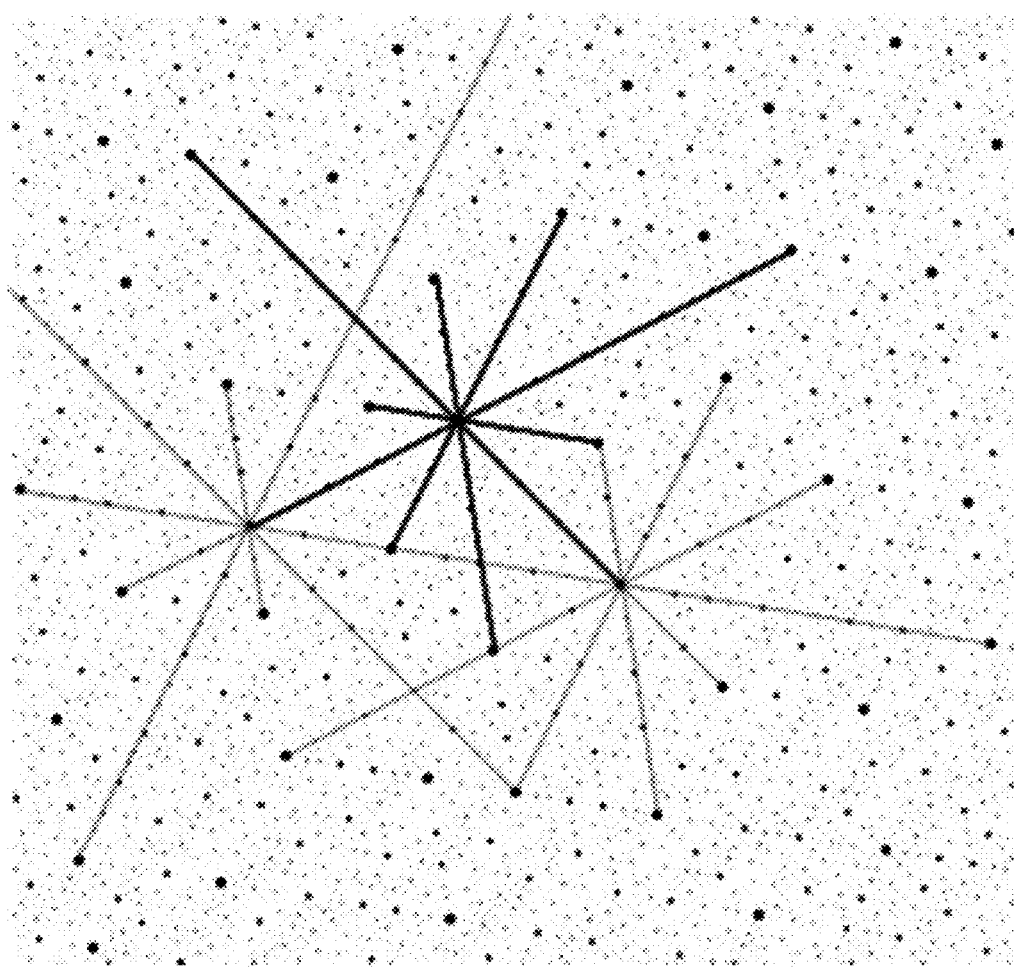
FIG. 4 illustrates identification of an imaged dot in a calculated grid, yielding the absolute coordinates of the imaged dot, in accordance with some embodiments of the present invention.

The local uniqueness of the pattern next to each dot allows identification of the imaged dot in the calculated grid, and thus yields the absolute coordinates of the imaged dot. FIG. 4 demonstrates this property graphically. The distances from each dot to its nearest neighbors in principle directions (quantized angles) comprise a signature of the dot. Moreover, the grid has the property such that nearest neighbor distances are quantized. If the minimal length is 1, then the next distance value is Golden Section ($\varphi=1.618$) times larger, and the next distance is $\varphi^2$ times larger, the next is $\varphi^3$ larger, etc. If the distances are marked correspondingly 1, 2, and 3, and those even further away as 0, any dot may be characterized by a word (alphanumeric sequence) having 10 digits with 4 possible values for each digit. In the illustration in FIG. 4, the dot signature is 3023323102. The signatures for each dot are stored in a dictionary. In some embodiments, the dictionary contains xy-positions of the dots together with their signatures.

In some embodiments, in the entire grid containing 2 million dots, the signatures are not unique. But, by searching for many dots in the dictionary, there will be an area of dots that are close together (accumulation area), and unique dots can be identified accordingly. This provides an error correction mechanism, as well. For example, even if some of the dot signatures contain errors, it is possible to identify the geometric area where most of the correctly identified dots are close together.

In some embodiments, rotational invariants of the signatures may be observed. In some embodiments, a dot together with its rotations has the same invariants. The discrete Fourier transform can then be obtained. The amplitudes A0, A1, . . . , A5 are 6 invariants. Fourier components A1, . . . , A4 have an imaginary part and thus phases. Three combinations of the phases are rotational invariants:

$$\Phi_1+\Phi_2+\Phi_3+\Phi_4 \bmod(2\pi)$$

$$\Phi_3-2\Phi_2+\Phi_1$$

$$\Phi_4-2\Phi_3+\Phi_2$$

Once the dots in the image are matched with those in the designed pattern, the geometric relationship between the dots becomes known. It is then possible to eliminate displacements that may occur due to the use of different cameras, and also to eliminate possible projective and spherical distortions. In one non-limiting example, mapping the image to a portion of the grid is performed using a spline approximation, but other known techniques can be used to map the image to a portion of the grid as well.

In certain examples, deterministic triangle splitting was performed, e.g., where two types of triangles are used (flat and tall), each with 5 possible orientations, 2 mirrors of each, and additionally 2 split orientations (right handed, and left handed). In some embodiments, where only single handed triangles are used, there may be too many repetitions of patterns. In some embodiments, a pattern is desired such that, at each zoom, it is possible to uniquely position imaged dots in the grid. In some embodiments, one method of reducing these repetitions is to use randomized handedness of triangles.

Thus, in certain embodiments, triangle splitting is randomized to avoid repeating pattern areas. Furthermore, in certain embodiments, it is desirable to avoid overlapping dots. In addition, in some embodiments it is desirable to make smaller dots white (or another suitable color in contrast to the larger dots) so that they can still be visible in the image if they are inside larger dots. In addition, in some embodiments, the dots are balanced (e.g., distributed throughout the pattern), such that they are accessible at different magnifications.

In a further example, the image size was 2160×2160 pixels, and the number of dots was optimized to that size. Thus, in some embodiments, the number of dots is optimized to the size of the image. For example, the following magnifications and image resolutions shown in Table 2 below may apply:

TABLE 2

| Magnifications and Image Resolutions for Images | | |
|---|---|---|
| Magnification (X) | Resolution (μm) | Image Width (mm) |
| 1.25 | 4.8 | 10.368 |
| 5 | 1.2 | 2.592 |
| 10 | 0.6 | 1.296 |
| 20 | 0.3 | 0.648 |
| 40 | 0.15 | 0.324 |
| 66 | 0.091 | 0.196 |

In some embodiments, there may be certain constraints for the pattern dot sizes and density. For example, a constraint may be the minimum dot size, for example, 3 micrometers, which corresponds to about 33 pixels at 66× magnification. Then, the first generation G1 dot size is then minimally 4.8 px at 1.25×, which is about 23 micrometers. The next generation G2 dot size is then about 2× less than G1 to guarantee reliable classification at 1.25×. The last (third) generation dots must remain in sufficient distance from G1 centers, e.g., L=R(G1)+3 μm+1.5 μm=16 μm. This condition puts constraints on achievable dot density. For each magnification, full dot generations can be used that have sufficient diameter for detection, e.g., for performance, all dots in some generation can be discarded to reduce the number of dots. In certain embodiments, the desired number of used (matched) dots per image is in the range of 200-600, which is sufficient for quadratic deformations, and at the same time, the number is not so high as to slow down computations. Thus, in some embodiments, an optimum number of dots is calculated and used such that calculations may be performed quickly, while still achieving a desired level of accuracy for the image.

In some embodiments, there are constraints for field positioning inside the pattern. For example, in some embodiments, it may be planned to routinely use two fields that are about 60% diagonally offset. In some embodiments, the diagonal offset may be any desired percentage. In some embodiments, the direction and shift will determine the pattern angle and scale with respect to plate coordinates. For example, it is possible to use the production dimensions of the pattern for defining scale, but if the production dimensions disagree with the dimensions of the table, there may be non-matching image edges when stitching. In some embodiments, it is desirable to guarantee enough positioning tolerance such that the diagonally placed fields are inside the pattern area.

Figure 5:
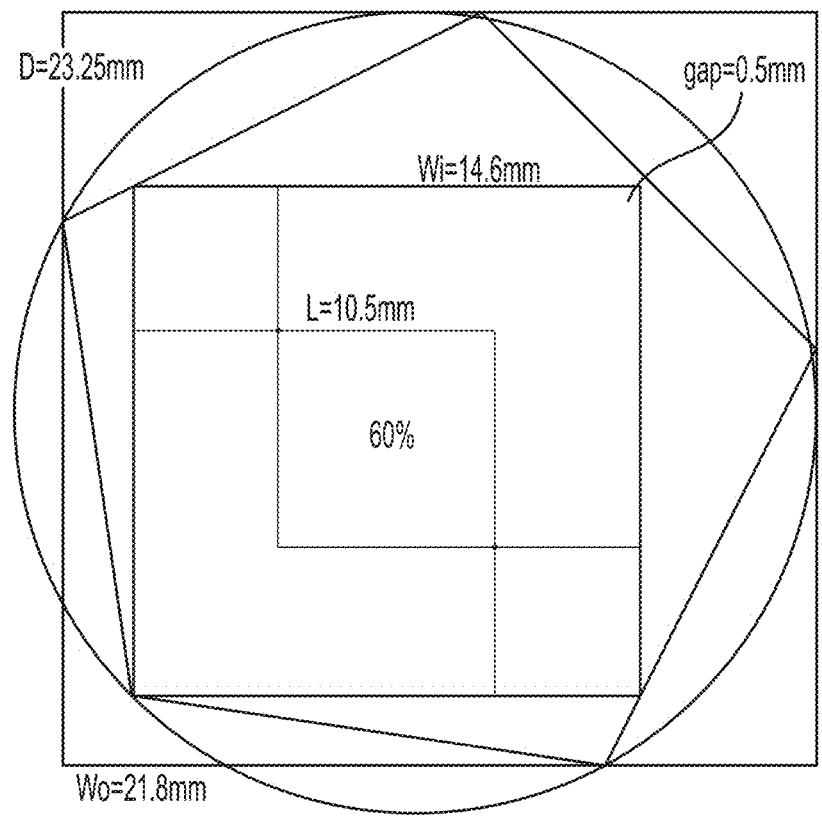
FIG. 5 shows a pentagon outline of a quasiperiodic grid that matches a given set of constraints (table design has reserved 23×26 $mm^2$ pattern area) for a particular application, in accordance with some exemplary embodiments of the present invention.
Figure 6A:
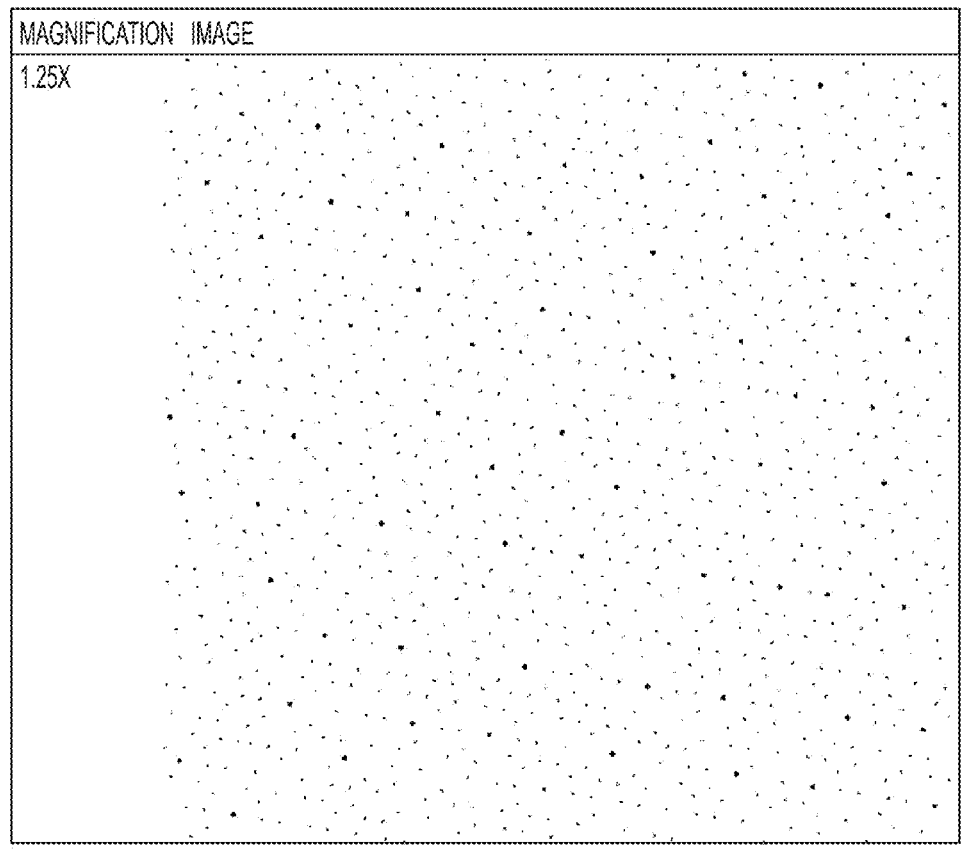
FIGS. 6A-F show generated dot images at indicated magnifications (cropped to 1000×1000 pixels and binned 2× for easier viewing), in accordance with some embodiments of the present invention.
Figure 6B:
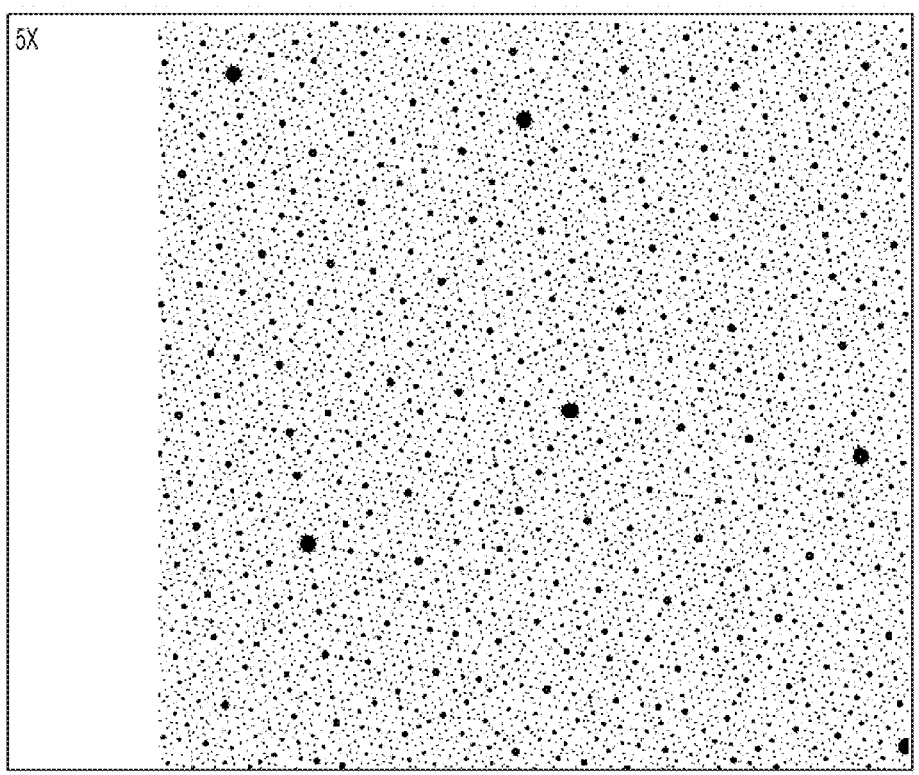
Figure 6C:
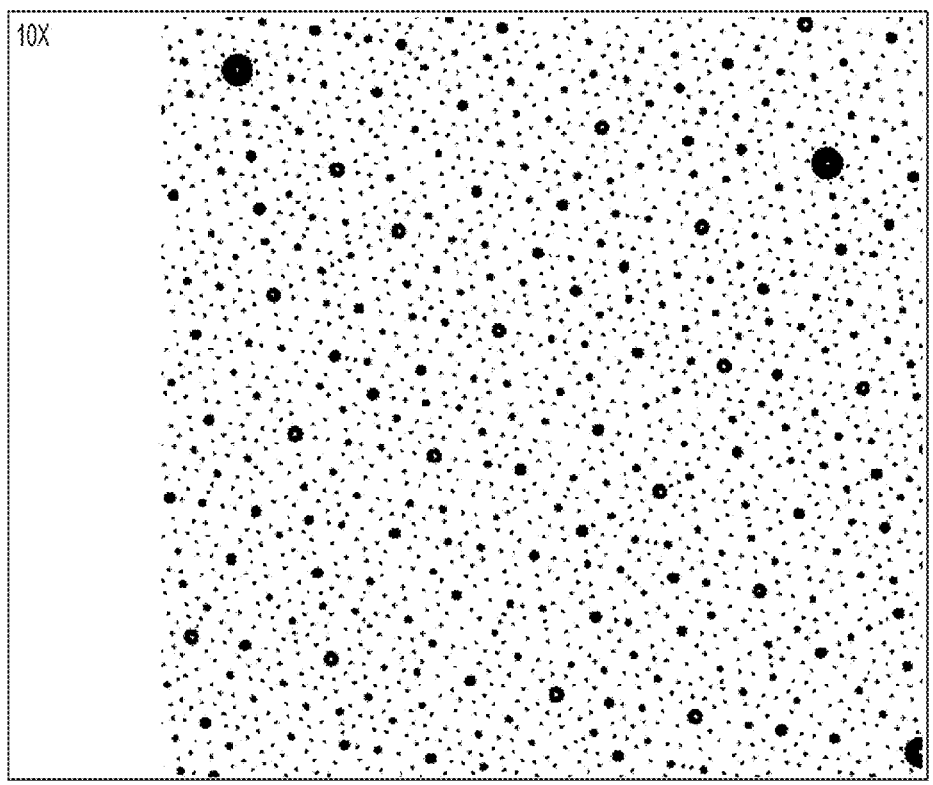
Figure 6D:
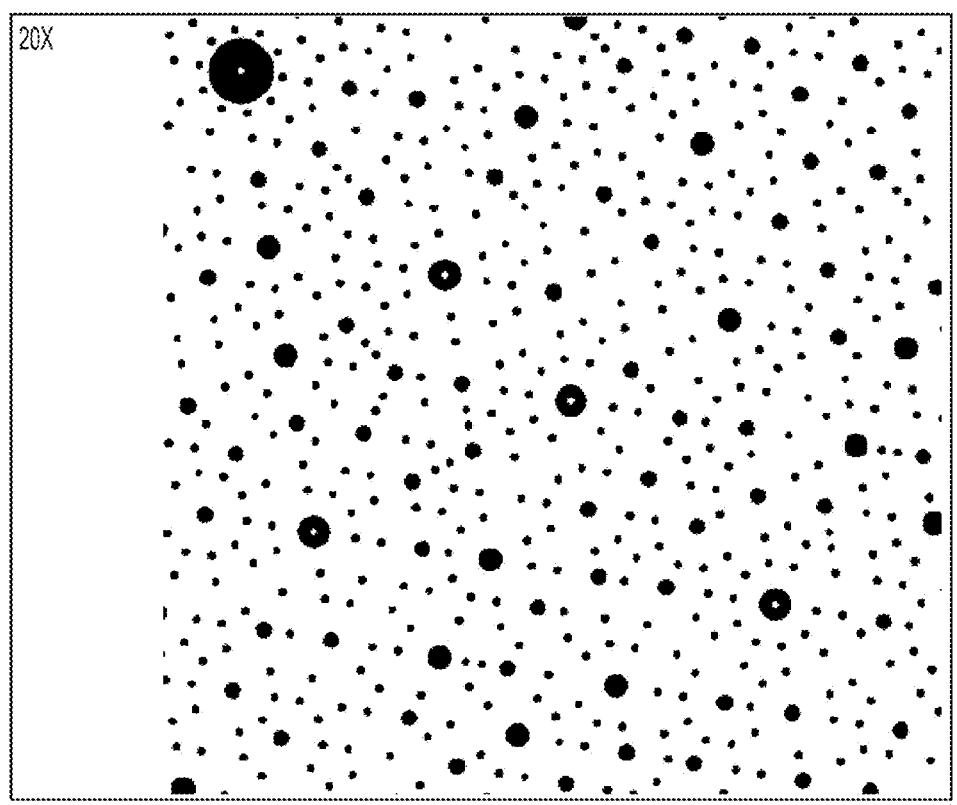
Figure 6E:
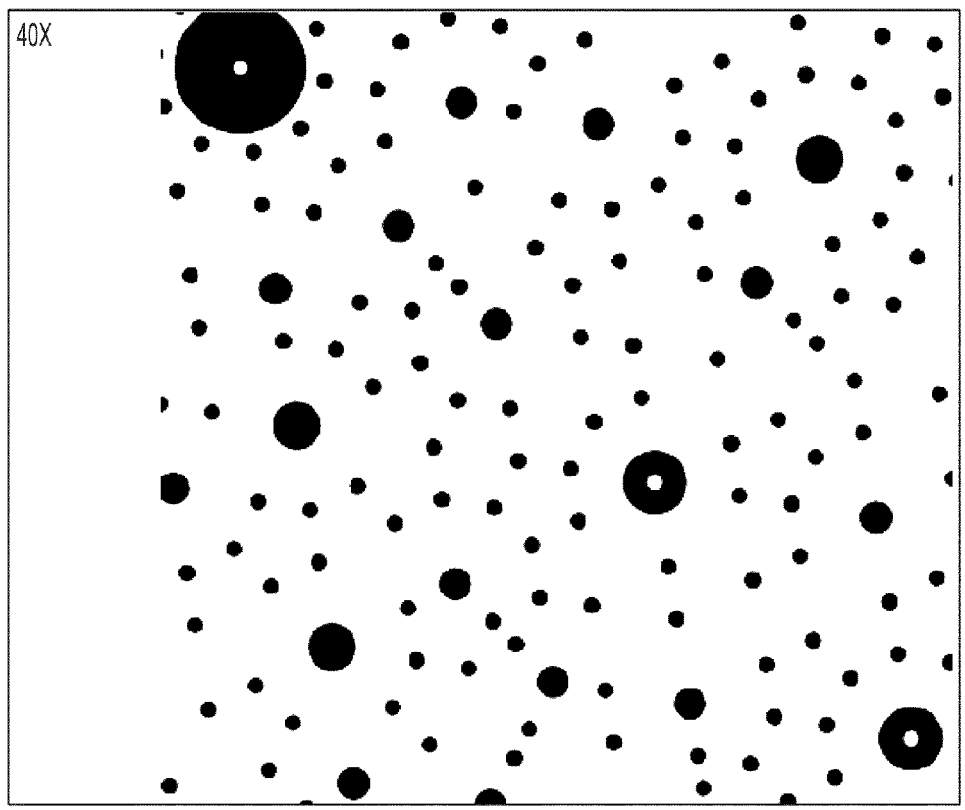
Figure 6F:
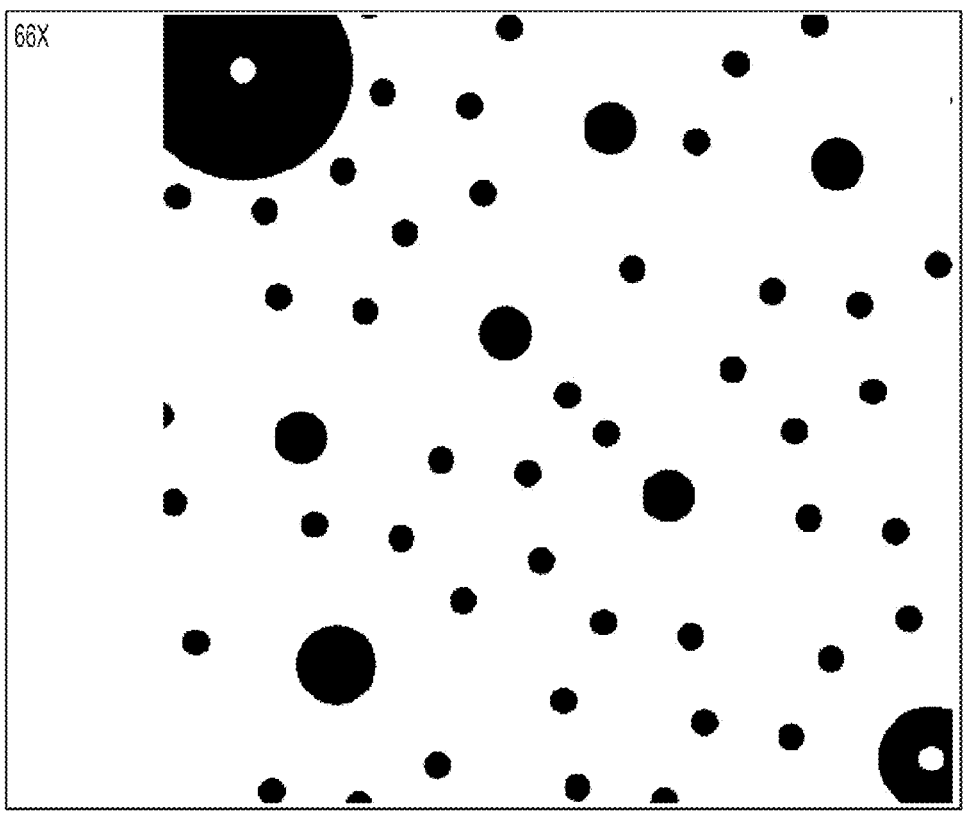

FIG. 5 shows an example pentagon outline of the quasi-periodic grid that matches a given set of constraints for a particular application. Here, the table design reserved a 23×26 mm² pattern area. It is known that with reasonable dot density, it is possible to achieve about 21-25 mm sized patterns in accordance with some embodiments discussed herein. In one example, the maximum fitting into table constraints was selected. The largest field of view (hereafter, "FOV") was about 10.5 mm, which for 60% overlap and the pattern size of 23.25 mm (bounding box of 21.8 mm) can be positioned inside the pattern with 0.5 mm tolerance (gap). A 1 mm tolerance is achievable with 64% overlap. A width of 22 mm would also fit a pentagonal outline structure around the pattern, with an extra 100 μm on both sides. 1 mm extra space was also present on both sides horizontally.

Pattern parameters could now be derived. The pattern size of 23.25 mm in this example can provide 212 dots per image at 66× when performing 29 iterations. If it is desired to make the area larger to fit the FOV more freely into the pattern, at least the 30$^{th}$ iteration may be required, which makes the G1 and G5 distance drop by the Golden Section ($\varphi$=1.618). The next usable range of pattern sizes is in the range of 34-38 mm. Thus, in this example, 29 iterations were selected, populated with 5 dot generations. The large size differences between G1 and G2 dots were explained above (G2 is about 2× less than G1 to guarantee reliable classification at 1.25×). The rest of the dots G3, G4, and G5 follow in the spectrum of 'production limit' minimum dot size of 3 μm, while linear steps in radius are also optimal to produce areas at equal steps of standard deviation if Poisson noise is assumed.

$$\delta A \sim \sqrt{A} \sim R$$

The average dot counts, dot sizes (D), and average nearest neighbor dot-to-dot distance (NNDDD) at different generations and magnifications may now be determined for this example, as shown in Table 3 below.

TABLE 3

| Dot Characteristics for Different Magnifications in FIGS. 6A-6F | | | | | | | | | | | | | | |
|---|---|---|---|---|---|---|---|---|---|---|---|---|---|---|
| | Count | | | | | | D | D (px) | | | | | | NNDDD |
| Generation | 1.25 X | 5 X | 10 X | 20 X | 40 X | 66 X | (μm) | 1.25 X | 5 X | 10 X | 20 X | 40 X | 66 X | (μm) |
| 1 | 297 | 19 | 5 | 1 | 0 | 0 | 23 | 4.8 | 19 | 38 | 77 | 153 | 253 | 599 |
| 2 | 5323 | 333 | 83 | 21 | 5 | 2 | 12 | 2.5 | 10 | 20 | 40 | 80 | 132 | 141 |
| 3 | | 1409 | 352 | 88 | 22 | 8 | 9 | 1.9 | 7 | 15 | 30 | 60 | 99 | 69 |
| 4 | | | 1493 | 373 | 93 | 34 | 6 | | 5 | 10 | 20 | 40 | 66 | 33 |
| 5 | | | | 2558 | 639 | 235 | 3 | | | 5 | 10 | 20 | 33 | 13 |

FIGS. 6A-F show the generated dot images at the indicated magnifications (cropped to 1000×1000 and binned 2× for better viewing). As seen from the 66× image in FIG. 6F, it is desirable, in certain embodiments, to present a white hole into the center of black G1 and G2 dots, otherwise the G1 and G2 dots are partially out of view, the mass center is not well-defined, and discarding these dots would leave too large an empty area (which could lead to a loss in accuracy). Here, the gap between G1 and G5 dots is 3 μm, and the center-to-center distance is 16 μm.

Figure 7:
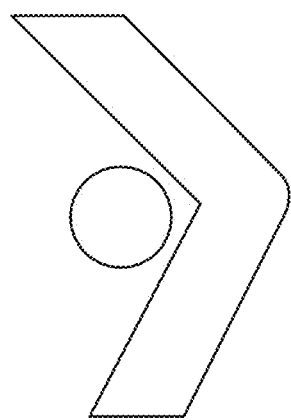
FIG. 7 illustrates an addition of an extra line outside a pattern pentagon, in accordance with some embodiments of the present invention.

In certain embodiments, an extra line is added outside the pattern pentagon, as shown in FIG. 7. For example, the distance from pentagon vertex to the line may be chosen to be R(G1)+gap+halfwidth. The line should have a halfwidth=10 μm and a gap 3.5 μm. The largest dot radius R(G1)=11.5 μm. Due to the line, the pentagon bounding box grows by about 80 μm from 21.84 mm to 21.92 mm.

Figure 8:
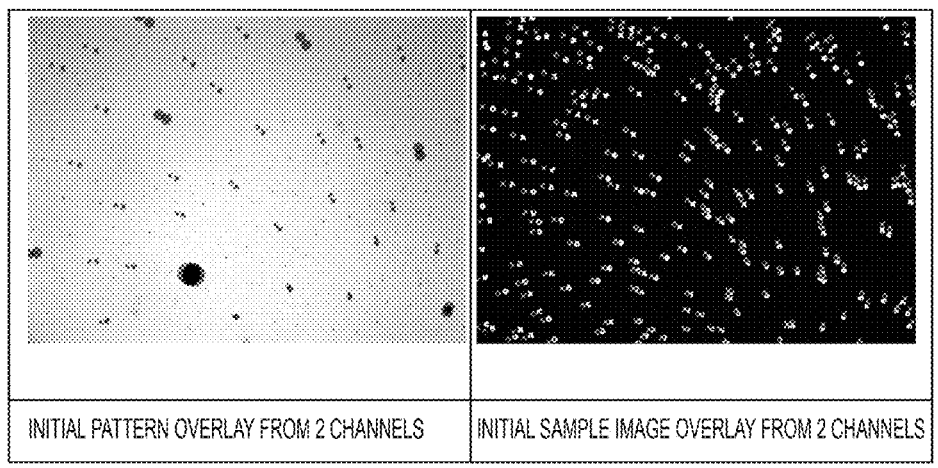
FIG. 8 demonstrates use of a geometric transformation determined using a quasiperiodic grid pattern to adjust an image of a sample, in accordance with some embodiments of the present invention.
Figure 8:
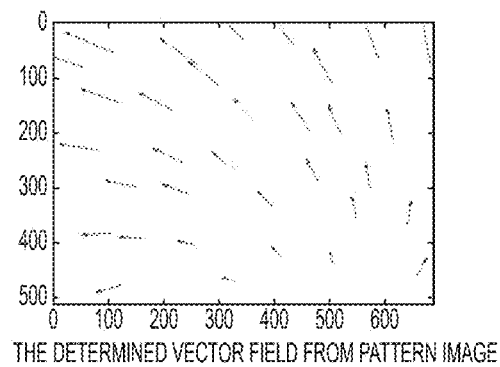
Figure 9:
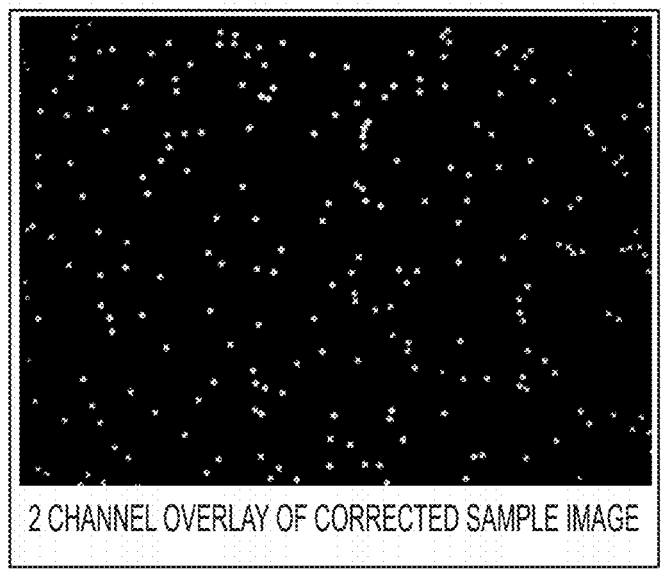
FIG. 9 demonstrates use of a geometric transformation determined using a quasiperiodic grid pattern to adjust an image of a sample, in accordance with some embodiments of the present invention.

FIGS. 8 and 9 demonstrate the use of the geometric transformation determined using a quasiperiodic grid pattern to adjust an image of a sample. FIG. 8 shows an initial pattern overlay from two channels (top left of FIG. 8), and an initial sample image overlay from two channels (top right of FIG. 8), where both the image overlay of the pattern of dots and the image overlay of the sample exhibit distortion and/or misalignment of channels. First, the expected (either absolute or relative) positions of each dot on the image of the pattern which is known from the construction of the pattern are determined. From the determined expected positions, a field of shifts pointing from expected positions to actual positions of the dots in the measured image is obtained (see FIG. 8, bottom left image). The determined field of shifts is approximated, for example, by one or more polynomial functions, e.g., two functions corresponding to shifts in x and y directions, both of which are functions of x and y positions in the image. Combinations of the polynomial coefficients can be interpreted as shifts, scaling, rotation, and nonlinear deformations. Then, the polynomial functions can be applied to images of the samples to correct for geometric distortions as long as the optical path of the measured light is at least approximately identical to that of the pattern measurement. By aligning all of the measured images to the same expected pattern positions, all measured images are automatically aligned with respect to each other (the images are automatically registered).

FIG. 9 shows the two-channel overlay of the corrected sample image.

Thus, in certain embodiments, a general workflow for image alignment and geometric correction includes the following steps:
1. Acquire the set of images of the pattern, and, for each image:
   a. Find the expected distortion free dot positions; and
   b. Calculate geometric transformation taking dot centers to expected positions; and
   c. Store the transformation.
2. For each sample:
   a. Acquire the set of images of the sample, and, for each image:
      i. Apply geometric transformations; and
      ii. Store the image.

In some embodiments, finding the expected distortion-free dot positions can be achieved by geometric reconstruction. In one example, the following steps are performed for the geometric reconstruction:
1. For each image in pattern image, set:
   a. Segment the image to find all dots;
   b. Calculate dot centers;
   c. Choose an arbitrary dot in the middle of the image and assume its position to be precise;
   d. Nearest neighbour dots are expected at 36° angles and at distances that are having ratios 1, $\varphi$, $\varphi^2$, where $\varphi$ is the Golden Section $\varphi=1.618\ldots$ Based on this geometric relations, expected positions can be assigned to each of the neighbouring dots;
   e. For each dot identified in step 1.d, step 1.d is repeated in each neighbourhood until there are no more dots in the image; and
   f. Dots that are at a relative position to its nearest neighbour that exceeds a given tolerance from expected positions are discarded.
2. A common reference dot is selected (e.g., arbitrarily) across all pattern images to have the same expected position and appropriate shift is applied to the expected dot centers;
3. The angle at which the nearest neighbour is expected to be positioned is selected (e.g., arbitrarily), and the expected coordinates of the dots are rotated accordingly;
4. The base length at which the nearest neighbour is expected to be positioned is selected (e.g., arbitrarily), and the expected coordinates of the dots are scaled accordingly;
5. As a result of steps 2-4, the expected positions of all correctly identified dots must coincide; and
6. The tables of actual and expected dot positions are stored.

In some embodiments, an alternative approach may be to identify the pattern image position in the expected dot position table used for pattern production. Here, one may translate the expected dot positions to image coordinates via steps analogous to steps 2-4 above.

In some embodiments, geometric transformation can be calculated taking the dot centers to expected positions. In some embodiments, the geometric transformation can be performed as follows:
1. For each table of expected and actual positions corresponding to a pattern image:
   a. Calculate the shifts required for each individual dot to move it to the expected position. The set of shifts, together with the positions they are applied to, is referred to herein as a shift field;
   b. Extend the shift field to the full image by approximating the found shift field by a continuous model (e.g., second order polynomials). It can be achieved by least squares fitting; and
   c. Store the polynomial coefficients for use on sample images.

Then, in some embodiments, the geometric transformations can be applied on sample images, for example, as follows:
1. For each image in the set of a sample:
   a. From the found polynomials, calculate shifts corresponding to each pixel of the image; and
   b. Apply the shifts to image raster data.

Figure 10:
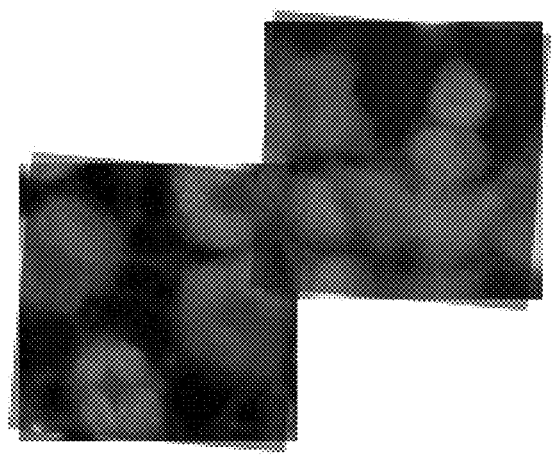
FIG. 10 illustrates multiple fields imaged with multiple cameras, where there is overlap in the fields, in accordance with some embodiments of the present invention.

FIG. 10 shows multiple fields imaged with multiple cameras (e.g., more than 1, more than 2, more than 3, more than 4, etc.), where there is overlap in the fields of the cameras. To obtain the images shown in FIG. 10, two cameras were used to each obtain two images at different wavelengths. In some embodiments, all the images are taken at different wavelengths. In some embodiments, at least one image is taken at the same wavelength as at least one other image. In some embodiments, the overlap in the fields of the cameras is less than 5%, about 5%, between about 5% to about 10%, between about 5% and about 25%, between about 15% and about 40%, between about 25% and about 50%, between about 35% and about 65%, between about 50% and about 70%, between about 65% and about 95%, above 95%, above 99%. Image registration of multiple images obtained by the same camera can be performed, as well as image registration of the two sets of images obtained by two different cameras can be performed, all while also taking care of image aberrations within a given field of view, by using the embodiments described herein.

Figure 11:
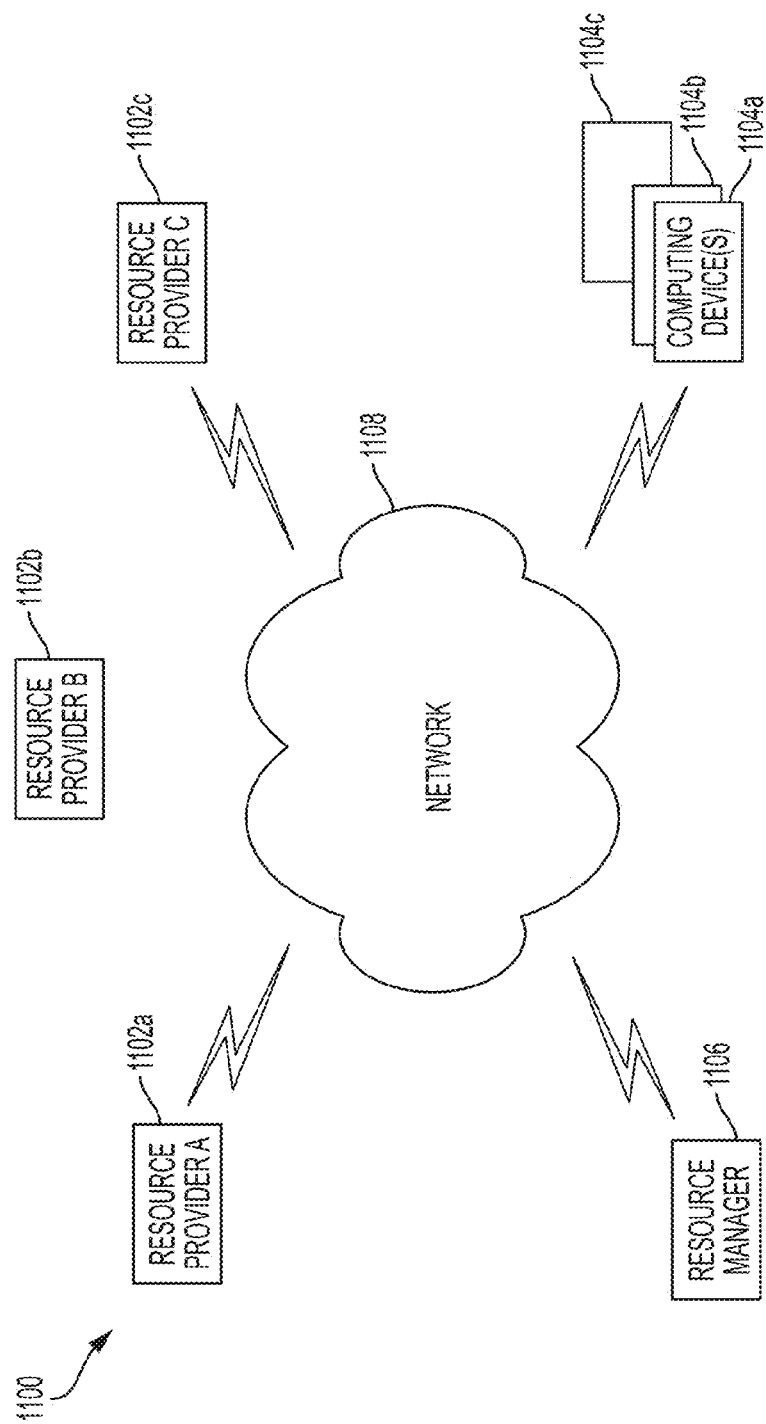
FIG. 11 is a block diagram of an example network environment for use in the methods and systems for image correction described herein.

FIG. 11 shows an illustrative network environment 1100 for use in the methods and systems for image correction, as described herein. In brief overview, referring now to FIG. 11, a block diagram of an exemplary cloud computing environment 1100 is shown and described. The cloud computing environment 1100 may include one or more resource providers 1102a, 1102b, 1102c (collectively, 1102). Each resource provider 1102 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1102 may be connected to any other resource provider 1102 in the cloud computing environment 1100. In some implementations, the resource providers 1102 may be connected over a computer network 1108. Each resource provider 1102 may be connected to one or more computing device 1104a, 1104b, 1104c (collectively, 1104), over the computer network 1108.

The cloud computing environment 1100 may include a resource manager 1106. The resource manager 1106 may be connected to the resource providers 1102 and the computing devices 1104 over the computer network 1108. In some implementations, the resource manager 1106 may facilitate the provision of computing resources by one or more resource providers 1102 to one or more computing devices 1104. The resource manager 1106 may receive a request for a computing resource from a particular computing device 1104. The resource manager 1106 may identify one or more resource providers 1102 capable of providing the computing resource requested by the computing device 1104. The resource manager 1106 may select a resource provider 1102 to provide the computing resource. The resource manager 1106 may facilitate a connection between the resource provider 1102 and a particular computing device 1104. In some implementations, the resource manager 1106 may establish a connection between a particular resource provider 1102 and a particular computing device 1104. In some implementations, the resource manager 1106 may redirect a particular computing device 1104 to a particular resource provider 1102 with the requested computing resource.

Figure 12:
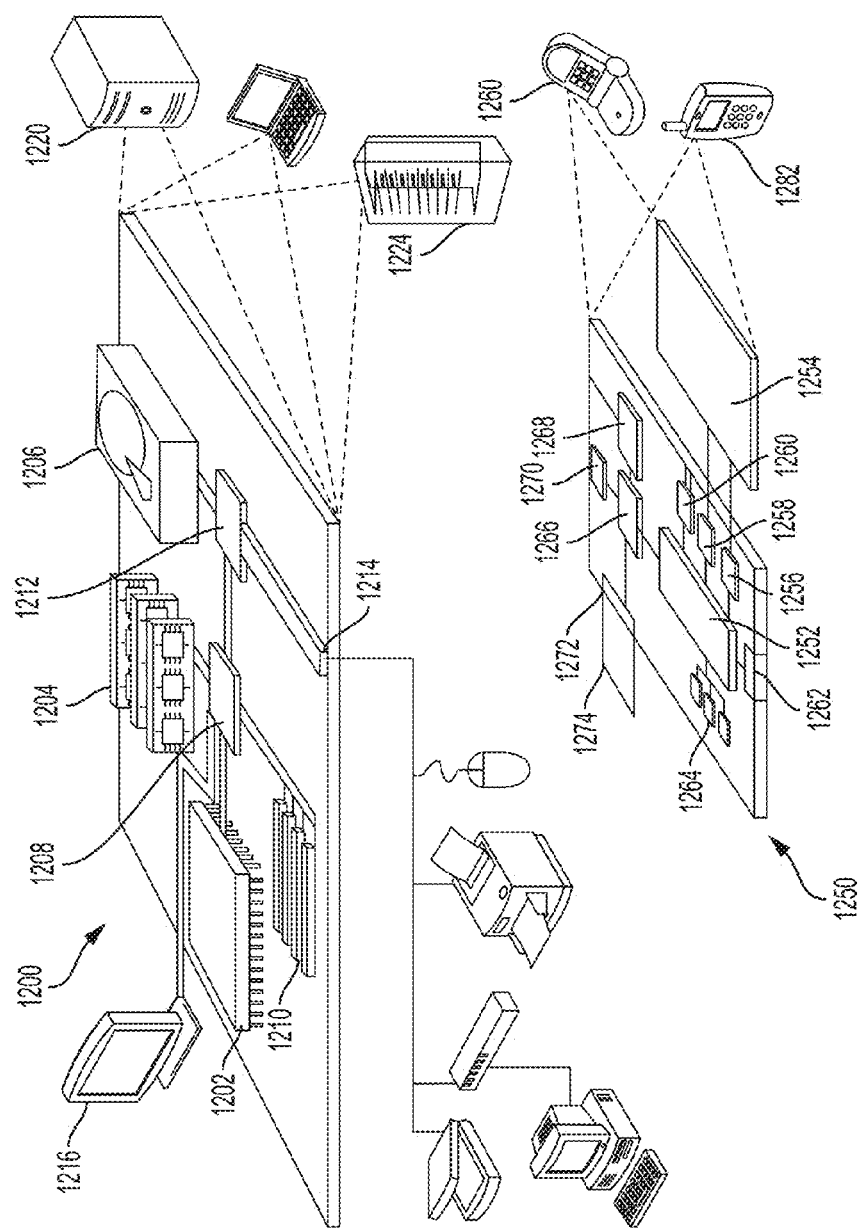
FIG. 12 is a block diagram of an example computing device and an example mobile computing device, for use in illustrative embodiments of the invention.

FIG. 12 shows an example of a computing device 1200 and a mobile computing device 1250 that can be used in the methods and systems described in this disclosure. The computing device 1200 is intended to represent various forms of digital computers, such as laptops, desktops, workstations, personal digital assistants, servers, blade servers, mainframes, and other appropriate computers. The mobile computing device 1250 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 may also be another form of computer-readable medium, such as a magnetic or optical disk.

The storage device 1206 is capable of providing mass storage for the computing device 1200. In some implementations, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1202), perform one or more methods, such as those described above. The instructions can also be stored by one or more storage devices such as computer- or machine-readable mediums (for example, the memory 1204, the storage device 1206, or memory on the processor 1202).

The high-speed interface 1208 manages bandwidth-intensive operations for the computing device 1200, while the low-speed interface 1212 manages lower bandwidth-intensive operations. Such allocation of functions is an example only. In some implementations, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device (not shown), such as a mobile computing device 1250. Each of such devices may contain one or more of the computing device 1200 and the mobile computing device 1250, and an entire system may be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate.

The processor 1252 can execute instructions within the mobile computing device 1250, including instructions stored in the memory 1264. The processor 1252 may be implemented as a chipset of chips that include separate and multiple analog and digital processors. The processor 1252 may provide, for example, for coordination of the other components of the mobile computing device 1250, such as control of user interfaces, applications run by the mobile computing device 1250, and wireless communication by the mobile computing device 1250.

The processor 1252 may communicate with a user through a control interface 1258 and a display interface 1256 coupled to the display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a SIMM (Single In Line Memory Module) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provided as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1252), perform one or more methods, such as those described above. The instructions can also be stored by one or more storage devices, such as one or more computer- or machine-readable mediums (for example, the memory 1264, the expansion memory 1274, or memory on the processor 1252). In some implementations, the instructions can be received in a propagated signal, for example, over the transceiver 1268 or the external interface 1262.

The mobile computing device 1250 may communicate wirelessly through the communication interface 1266, which may include digital signal processing circuitry where necessary. The communication interface 1266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1268 using a radio-frequency. In addition, short-range communication may occur, such as using a Bluetooth®, Wi-Fi™, or other such transceiver (not shown). In addition, a GPS (Global Positioning System) receiver module 1270 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in the figure. For example, it may be implemented as a cellular telephone 1280. It may also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for adjusting one or more images of a sample to align the one or more images, the method comprising:
    obtaining one or more images of the sample using one or more cameras at fixed position(s) with respect to the sample;
    obtaining one or more images of a two-dimensional graphical pattern using the same one or more cameras in the same fixed position(s) that were used to obtain the one or more images of the sample,
        wherein the graphical pattern is a lattice comprising dots at vertices that define one or more types of geometric shapes,
        wherein the lattice of dots is non-periodic,
        and wherein absolute positions of the imaged dots can be determined; and
    automatically adjusting, by a processor of a computing device, the one or more images of the sample using the one or more images of the two-dimensional graphical pattern to align the one or more images of the sample.

2. The method of claim 1, wherein the lattice of dots is hierarchical.

3. The method of claim 1, wherein the lattice of dots has one, two, three, or all four of the following properties:
    (i) local uniqueness;
    (ii) approximately uniform local density of dots;
    (iii) ability to match an imaged dot with its expected location in the pattern from easily-identified, quantized nearest neighbor relations; and
    (iv) dots of the graphical pattern have a discrete set of possible mutual positions.

4. The method of claim 1, wherein the step of automatically adjusting the one or more images of the sample comprises determining one or more geometric transformations according to a mapping between imaged dots in the one or more registration images and the determined absolute positions of the dots, and applying the one or more geometric transformations to the one or more images of the sample to align the one or more images of the sample.

5. The method of claim 1, wherein the one or more images of the sample comprises one or more images of a multiple-well microtiter plate, and wherein the one or more cameras comprises one or more cameras of a microplate imager.

6. The method of claim 1, wherein the graphical pattern inhabits the same plane, or approximately the same plane, as the sample, in relation to the one or more cameras.

7. The method of claim 1, wherein the dots of the graphical pattern comprise at least one or more members selected from the group consisting of closed circles, open circles, closed non-circular shapes, and open non-circular shapes.

8. The method of claim 1, wherein the dots of the graphical pattern are vertices defining pentagons subdivided into triangles.

9. The method of claim 1, wherein the lattice of dots is hierarchical, wherein hierarchical means the pattern comprises dots that are differently-sized according to which of a plurality of generations they belong to.

10. The method of claim 1, wherein the absolute position of an imaged dot is determined by detecting distances to nearest neighbors of the imaged dot in a fixed number of principle directions to identify the corresponding unique dot of the geometric pattern and its known absolute position.

11. The method of claim 1, comprising obtaining multiple images of the sample at different wavelengths either using multiple cameras, or using one camera at different times, and using the one or more images of the two-dimensional graphical pattern to align the multiple images of the sample at different wavelengths, wherein the lattice of dots of the graphical pattern is non-periodic.

12. The method of claim 11, wherein the graphical pattern is also hierarchical.

13. The method of claim 1, comprising obtaining multiple images of the sample using multiple cameras, thereby obtaining images having different fields of view, and using the images of the two-dimensional graphical pattern obtained using the multiple cameras to align the multiple images of the sample, wherein the lattice of dots of the graphical pattern is non-periodic.

14. The method of claim 13, wherein the graphical pattern is also hierarchical.

15. The method of claim 1, comprising obtaining multiple images of the sample at multiple resolutions, and using the images of the two-dimensional graphical pattern to align the multiple images of the sample, wherein the graphical pattern of dots is hierarchical.

16. A system for adjusting one or more images of a sample to align the one or more images, the system comprising:
    a processor; and
    a memory having instructions stored thereon, wherein the instructions, when executed by the processor, cause the processor to:
        automatically adjust the one or more images of the sample using one or more images of a two-dimensional graphical pattern to align the one or more images of the sample,
            wherein the graphical pattern is a lattice comprising dots at vertices that define one or more types of geometric shapes,
            wherein the lattice of dots is non-periodic,
            wherein absolute positions of the imaged dots can be determined, and wherein the one or more images of the two-dimensional graphical pattern were obtained using the same one or more cameras in the same fixed position(s) that were used to obtain the one or more images of the sample.

17. The method of claim 1, wherein the lattice of dots is quasiperiodic.

18. The system of claim 16, wherein the lattice of dots is quasiperiodic.

* * * * *